United States Patent [19]

Barker

[11] 4,381,092
[45] Apr. 26, 1983

[54] MAGNETIC DOCKING PROBE FOR SOFT DOCKING OF SPACE VEHICLES

[75] Inventor: Walter F. Barker, Denver, Colo.

[73] Assignee: Martin Marietta Corporation, Bethesda, Md.

[21] Appl. No.: 259,777

[22] Filed: May 1, 1981

[51] Int. Cl.³ .............................................. B64G 1/64
[52] U.S. Cl. .................................... 244/161; 114/250; 403/57; 403/146; 244/115
[58] Field of Search ......................... 244/2, 3, 158–163, 244/115, 116; 294/65.5; 280/484; 414/2; 114/249, 250; 403/111, 57, 146, 126, 149, 166

[56] References Cited

U.S. PATENT DOCUMENTS

| | | | |
|---|---|---|---|
| 2,127,689 | 8/1939 | Johnson | 280/484 |
| 2,171,999 | 9/1939 | Weiland | 403/57 |
| 2,499,569 | 3/1950 | Cooley | 403/57 |
| 3,201,065 | 8/1965 | Dunn | 244/161 |
| 3,478,711 | 11/1969 | Combs | 114/249 |
| 3,893,573 | 7/1975 | Fletcher et al. | 414/2 |
| 4,177,964 | 12/1979 | Hujsak et al. | 244/161 |

OTHER PUBLICATIONS

"Apollo Probe, Drogue Exceed Expectations", Aviation Week and Space Technology, 3/17/1969.

Primary Examiner—Galen L. Barefoot
Attorney, Agent, or Firm—Sughrue, Mion, Zinn, Macpeak and Seas

[57] ABSTRACT

A boom formed by spring biased telescoping tubes is gimbaled at one end to a docking or probe space vehicle and at the opposite end to an electromagnet probe with the gimbaled joints spring biased to axially align the assembly. A light weight conical drogue fixed to the captive space vehicle mounts a passive iron target at the cone apex. The electromagnet guides itself into contact with the target during space coupling. The tubes telescope against springs which dampen impact along with columb dampening created by the telescoping tubes. A switch mounted to the electromagnet automatically energizes the retraction motor upon contact with the passive iron target. A retraction wire functions to initially pivot a plurality of radial rigidizing struts into contact with the circular edge of the light weight drogue cone to automatically align the spacecraft for pitch and yaw. An azimuth drive motor proximate to the inboard gimbal functions to rotate the end of the boom and thus the captive space vehicle about the axis of the boom for roll correction. Further retraction assists in hard-docking of the probe space vehicle to the captive space vehicle.

13 Claims, 6 Drawing Figures

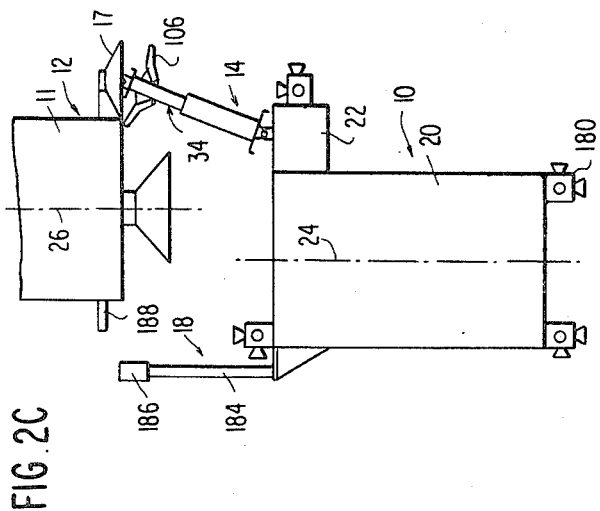
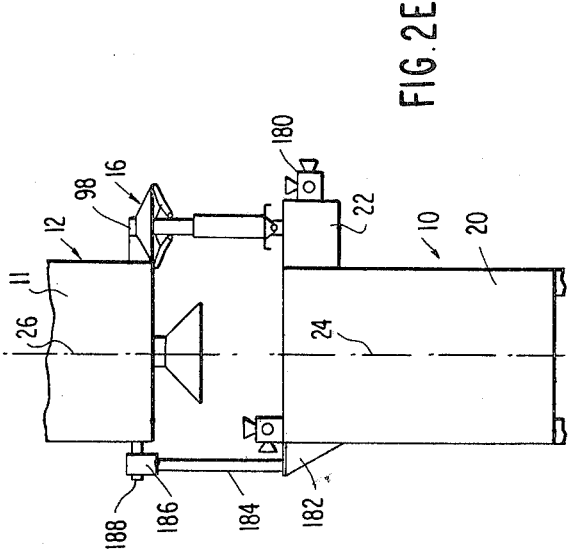
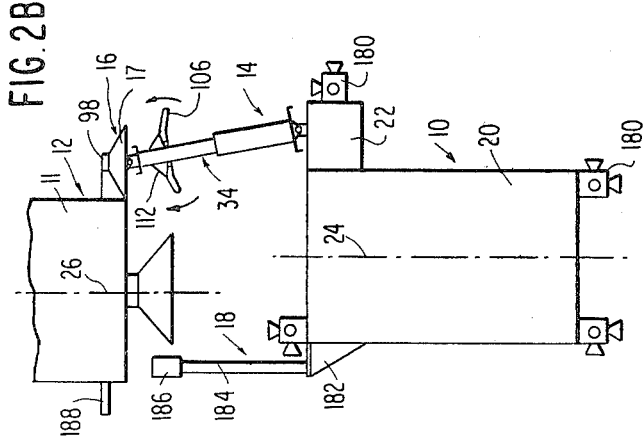
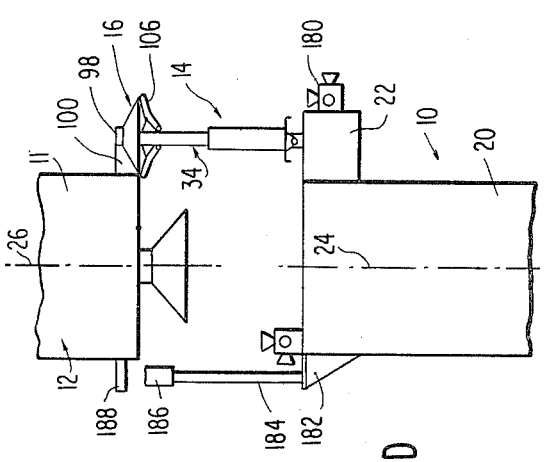
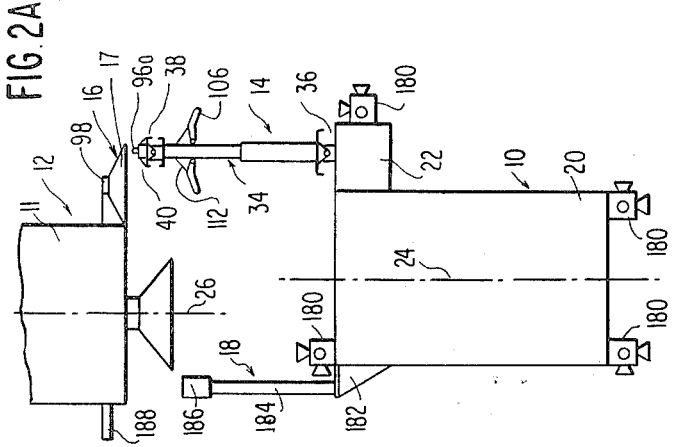

MAGNETIC DOCKING PROBE FOR SOFT DOCKING OF SPACE VEHICLES

FIELD OF THE INVENTION

This invention relates to magnetic docking probes, and more particularly to an improved magnetic docking probe assembly permitting soft docking with simplified pitch, yaw and roll correction for the docking space vehicle relative to the captive space vehicle.

BACKGROUND OF THE INVENTION

Various systems have been employed in docking space vehicles to each other or linking up artificial satellites, thereby permitting the delivery of items or personnel from one space vehicle to another. U.S. Pat. No. Re. 27,903 to C. P. Fogarty issued Jan. 29, 1974, discloses the utilization of a magnetic harpoon constituted by an extensible and retractable coupling member. A permanent magnet or an electromagnet is directionally propelled, outwardly of a space vehicle and towards a designated target area. It is connected to the probe space vehicle, bearing the same, by a flexible extensible cable or the like. By magnetic attraction coupling is achieved between the magnetic harpoons and the fixed magnet or target borne by the object being contacted. Retraction means permit the space or vehicle bearing the magnetic harpoon to be pulled towards the captured object bearing the magnetic target.

U.S. Pat. No. 3,508,723 to A. P. Warren et al issued Apr. 28, 1970, teaches a docking technique for spacecraft involving the utilization of telescoping cylinders, permitting projection and retraction of a mechanical probe from one spacecraft into the rocket engine nozzle of the other spacecraft and by expanding the device lateral securing of one spacecraft directly to the nozzle of the rocket engine of the other craft.

U.S. Pat. No. 3,526,372 to T. O. Paine issued Sept. 1, 1970, shows cooperation between a probe and a drogue assembly for mechanically linking two space vehicles. The probe is mounted to the end of one of the vehicles by way of a telescoping boom which is extended and retracted. The end of the boom carries a contact head having capture latches for engaging a cooperating drogue mechanism. The drogue is of funnel-shaped configuration, such that a conical probe head is guided towards the drogue apex until spring loaded capture latches engage and lock into a mating capture ledge borne by the drogue.

Such prior art is exemplary of known techniques in coupling and effecting alignment between two space vehicles. While attempts have been made to suppress or dampen the forces resulting from impact of the probe with respect to the contact vehicle, "bumping" accompanying contact and alignment has resulting in the disturbance with the electronic gear carried by the satellite. Additionally, certain of the prior designs tend to bounce away unless nearly perfect alignment is achieved. Also capture latches have been the source of docking problems, particularly in the Apollo project. The attitude control systems in many satellites will not tolerate "bumping" to the degree likely to occur with Apollo, EOTS, or RMS end effector designs. Certain of the probes, while being compliant to thereby permit connection or coupling between vehicles which are other than accurately aligned, cannot be subsequently rigidized after achieving "capture", nor are they adaptable for cooperation with more rigid locking members carried by the space vehicle attempting capture to insure upon accurate alignment, effected by the docking probe itself, multiple point rigid locking between the captive vehicle and the probe vehicle effecting the capture.

It is, therefore, a primary object of the present invention to provide an improved shock absorbing, boom-type magnetic docking probe, permitting initial soft docking of a first space vehicle with a satellite or second space vehicle in orbit and, permitting upon capture, the rigidization of the boom and aligning of the probe vehicle with the captured vehicle in pitch, yaw and roll.

It is a further object of the present invention to provide an improved magnetic soft docking probe for a space vehicle which eliminates any tendency of the captive vehicle to bounce away from the capture spacecraft and which permits by retraction of the flexible shock-absorbing boom, the satellite or captive spacecraft to be engaged in a hard-dock with the probe vehicle.

SUMMARY OF THE INVENTION

The present invention is directed to an improved magnetic type soft docking probe and a soft docking system for impact free docking between a docking space vehicle and a captive space vehicle. The probe space vehicle comprises a magnetic probe, preferably an electromagnet. Means, preferably a boom formed by telescoping tubes, connects at one end to the probe space vehicle and at the opposite end to the electromagnet through orthogonal joints defined by spring biased gimbals. The tubes are spring biased into boom extended position with the springs also functioning to dampen axial impact forces during docking. A magnetic target member is carried by the capture space vehicle, and guide means surrounding the magnetic target function to guide the magnetic probe into contact with the magnetic target during magnetic attraction between these members.

Preferably, the guide means comprises a light weight drogue cone and the electromagnet probe is generally conical in form such that the magnetic probe seeks the axis of the drogue cone. Retraction means is provided for retracting the telescoping tubes, after first causing a plurality of rigidizing struts, which are pivoted at one end to the side of the outboard tube, at circumferentially spaced positions, to pivot from near radial toward the drogue cone and into contact with the circular edge of the light weight drogue cone to automatically align the telescoping tube assembly and thus, by reaction, the captive space vehicle relative to the probe space vehicle for pitch and yaw, prior to reducing the distance between the two vehicles.

An azimuth drive motor coupled to the docking space vehicle, functions to rotate the boom telescoping tube assembly about its axis and to thereby drive the capture space vehicle by reaction, about the axis of the telescoping tubes for roll alignment of the captive space vehicle relative to the probe space vehicle. The gimbal joints being spring biased insure axial alignment of the electromagnet and docking vehicle base with the boom. The aft gimbal acts in conjunction with a spring biased piston and cylinder within the docking space vehicle mounting base to absorb the docking shock in the lateral direction while the gimbals are "uncaged". A constant force spring forms with a pin and slot mounting of one pulley bearing the retraction cable, a cable tensioning mechanism for the retraction cable. The cable is retracted through an electric motor driven jack screw. The cable is connected to the rigidizing struts through a spring cartridge, permitting absorption of shock while insuring automatic alignment for pitch and yaw of the docking space vehicle relative to the captive vehicle.

Two such magnetic probes or a single magnetic probe employing an azimuth drive mechanism may be utilized to triaxially orient the captured vehicle relative to the probe space vehicle. Full retraction occurs after pitch, yaw and roll orientation is effected between vehicles.

BRIEF DESCRIPTION OF THE DRAWINGS

FIGS. 2A through 2E inclusive are schematic views in sequence of the magnetic type, soft docking system of the present invention as applied to a probe space vehicle employing in addition to the soft magnetic docking probe, one or more additional "hard dock" mechanisms for rigidly locking the space vehicles together in a desired orientation in pitch, yaw and roll.

DESCRIPTION OF THE PREFERRED EMBODIMENT

Figure 1:
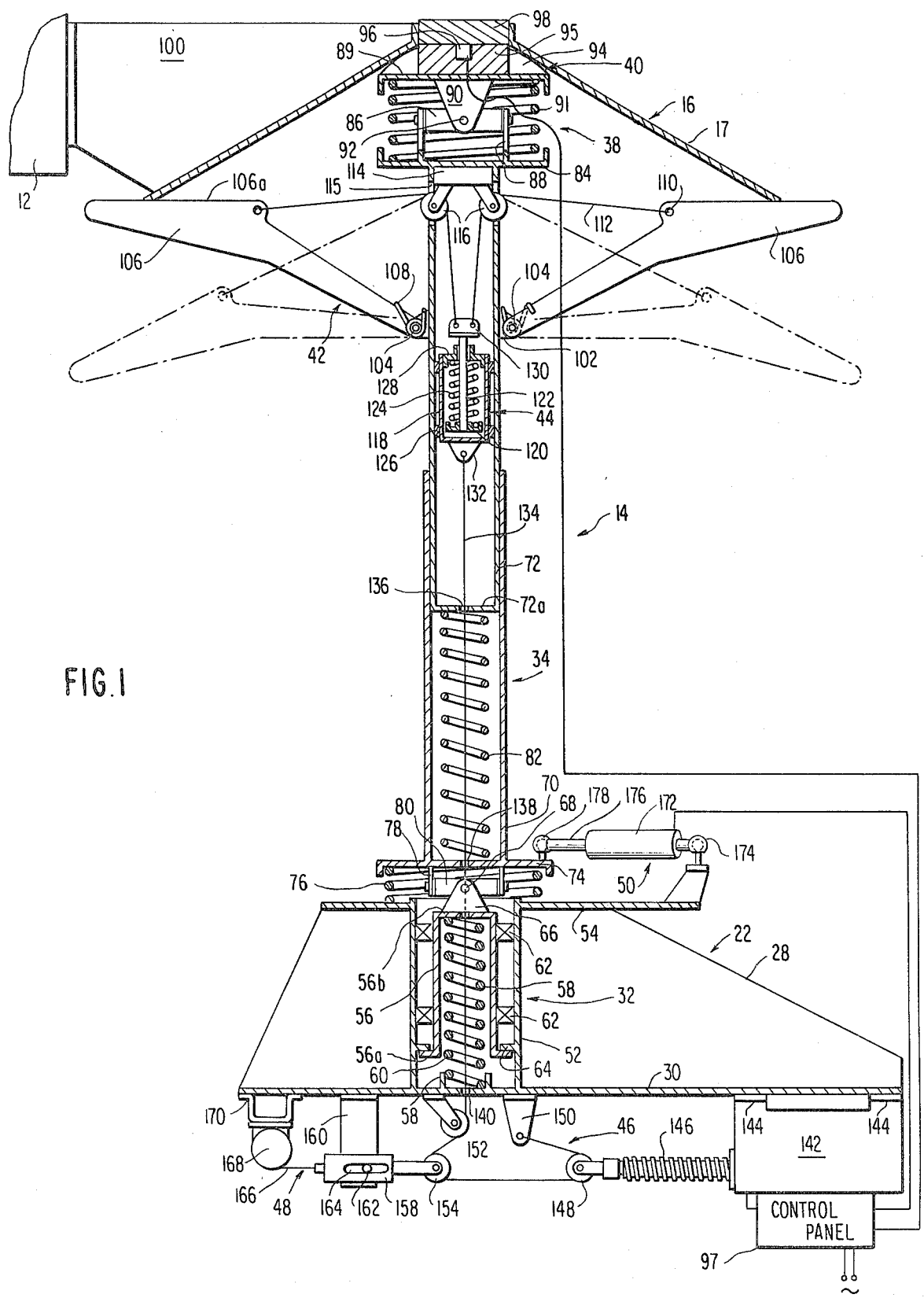
FIG. 1 is a longitudinal sectional view of one form of the improved magnetic type docking probe forming a principal component of the present invention.

Referring to the drawings, and first to FIG. 2A, the present invention has to do with a magnetic soft docking system and to a docking probe 14 forming a component of a probe or docking space vehicle or spacecraft, indicated generally at 10. The probe indicated generally at 14, effects controlled soft docking of the docking or probe space vehicle 10 with a captive space vehicle, indicated generally at 12, and which may be an earth orbiting satellite or the like.

In terms of the docking system, a drogue indicated generally at 16 is physically mounted to the orbiting space vehicle 12 which system in the illustrated embodiment, further includes one or more "hard dock" mechanisms indicated generally at 18 for fixedly locking the two space vehicles together in proper three axis orientation. In the illustrated embodiment, this insures coaxial alignment of axes 24 and 26 for vehicles 10 and 12 respectively. Vehicle 10 bears on vehicle body 20, the magnetic soft docking probe assembly 14, by way of a mounting base indicated generally at 22. The system operation will be described in detail hereinafter with respect to the sequence illustrated in FIGS. 2A through 2E inclusive.

Reference may now be had to FIG. 1, constituting a longitudinal sectional view of the components making up the magnetic soft docking probe 14 and its nature of engagement with the drogue 16. A magnetic target 98 is borne by a light weight dorgue cone 17, at its apex.

The probe 14 is mounted by way of base 22, to one side of the probe space vehicle body 20, which base projects radially outwardly therefrom. The base 22 includes a wall 28 rising at right angles from a base plate 30, with the wall 28 separated into two portions by a spring biased boom mounting piston assembly indicated generally at 32. Assembly 32 connects to a first spring biased gimbal, indicated generally at 36, normally in uncaged condition. Assembly 32 functions to absorb docking shock in a lateral direction via a coil spring 58, forming a component of assembly 32. The gimbal 36 is formed between base 22 and a boom or telescoping tube assembly 34, which boom permits extension and retraction of an electromagnet 40 mounted to the opposite end thereof by way of second spring biased gimbal 38. A rigidizing apparatus indicated generally at 42 is borned by the telescoping tube assembly 34 to automatically align the captive space vehicle 12 for pitch and yaw by contact with and reaction to the presence of the light weight drogue cone 17. Cone 17 functions to guide the electromagnet 40 into contact with the passive iron target 98 located at the apex of cone 17. Operation of the rigidizing apparatus 42 is effected by way of cables through the use of a spring cartridge indicated generally at 44 as part of an electrical motor driven retraction system indicated generally at 46. A cable tensioner, indicated generally at 48, insures a constant tension acting on the rigidizing apparatus 42 and on the spring biased telescoping tube assembly or boom 34 which is retractable under the operation of the retraction mechanism 46 and which is spring biased towards the extended position. Boom 34 is driven between extended and retracted positions, and vice versa through a jack screw 146 forming a component of the retraction mechanism 46.

While one soft docking magnetic probe 14 provides for automatic alignment of pitch and yaw during the soft docking, correction for roll between vehicles is achievable as an optional feature through an azimuth drive mechanism indicated generally at 50. However, if two or more soft docking magnetic probes are employed and carried by the docking space vehicle, at spaced locations, automatically the system will not only align itself for pitch and yaw, but also seek a position of correct roll orientation between the docking vehicle and the captive vehicle.

In the illustrated embodiment, however, a single soft docking magnetic probe 14 is employed which acts in conjunction with one or more hard-docking mechanisms as at 18, FIG. 2A.

The magnetic soft docking probe 14, in the form of the illustrated embodiment, includes an outwardly open cylinder 52 fixed to the base plate 30, preferably integral therewith and extending at right angles to that plate. It terminates at its opposite end in radially outward annular flange 54, defining an abutment plate or stop. A radially inwardly directed collar 64 is provided to cylinder 52 near base plate 30, functioning as an axial stop for a flanged cylindrical piston 56. Piston 56 is open at the end facing base plate 30 and includes a radially outward flange 56a which axially abuts collar 64 to limit axial movement of the cylindrical piston 56 relative to cylinder 52 and base plate 30. The base plate 30 is further provided with a ring 58 on one face, internally of cylinder 52, which functions to locate and position one end of a coil spring 60 whose opposite end abuts the closed end 56b of cylindrical piston 56. The coil spring 60 functions to bias the cylindrical piston 56 outwardly and away from base plate 30 with flange 56a abutting collar 64. Spaced teflon bearings are provided at 62 between the cylinder 52 and piston 56 which permit the cylindrical piston 56 to move axially within cylinder 52 as well as to rotate with respect to the cylinder and base plate 30, about its axis.

The boom or telescoping tube assembly 34 includes a relatively large diameter outer tube 70 within which sealably slides a smaller diameter inner tube 72. Tube 72 is closed off at its inner end as at 72a.

The outer diameter of the inner tube 72 is just slightly less than the inner diameter of the outer tube 70 so that there is a close sliding fit between the tubes. The outboard end of tube 70 is open to receive the inner tube 72, while the opposite end of the outer tube 70 is closed off by way of an enlarged diameter disc 74 whose periphery extends radially beyond the tube 70 and which terminates in a peripheral flange 74a which functions as a hard stop for the outer tube 70 during pivoting thereof or under docking axial impact. Interposed between the disc 74 and plate 54 is a large diameter coil spring 76, the coil spring 76 tending to axially align the telescoping tube assembly 34 with cylinder 52 of base 22. Cylindrical piston 56 bears laterally spaced parallel ears 66 on the closed end 56b which functions in conjunction with pivot pin 68 and a further pivot pin 80 borne by ears 78 on the side of disc 74, opposite that to which the outer tube 70 is fixed, to define the inner spring biased gimbal 36, permitting orthogonal movement of the telescoping tube assembly 34 about right angle intersecting axes as defined by pins 68 and 80. Pin 68 is rotatable about its axis, pin 80 is fixed to pin 68 at its center, but is also rotatable about its axis on ears 78. As may be appreciated, relative to plate 54 and base 22, the boom 34 may take an angular position with two degrees of freedom defined by the axes of gimbal pins 68 and 80. Smaller diameter tube 72 is not only closed off at end 72a, but its opposite end is closed off by a radially enlarged disc 84. Disc 84 forms, with a second equally sized disc 89, a coil spring 91 and two gimbal pins 86 and 92, respectively, borne by ears 88 integral with disc 84 and 90 integral with disc 89, the second spring biased gimbal 38. Gimbal 38 allows the electromagnet 40 to be orthogonally mounted to the opposite end of the telescoping tube assembly 34 from that coupled to base 22 and "uncaged" with respect to the base. An electromagnetic coil 94 surrounds an electromagnet core 95, the configuration given to the electromagnet 40 being spherical or conical and being dimensioned correspondingly to cone 17 at its apex. The passive iron target 98 is of disc shape and corresponds to the diameter of core 95 of the electromagnet 40. The cone 17 is fixed to the side of the captive space vehicle 12 by means of a bracket 100.

For illustration purposes, the two vehicles 10 and 12 are cylindrical in form and have the same diameter. Bracket 100 is sized to insure an automatic alignment for pitch and yaw of the capture spacecraft 12 when the electromagnet core is fully within the cone 17 and with the electromagnet 40 aligned with and in contact with the passive iron target 98. The discs or plates 84 and 89 are flanged at their ends to provide positive stops in the event that the coil spring 91 nears full compression during impact, springs 91 and 76 for gimbals 36 and 38 being light springs. Coil spring 82 interposed between the end 72a of the inner tube 72 and or plate 74, at the end of the outer tube 70, functions to hold the probe 14 extended and also to absorb axial docking shock transmitted through the tubular assembly.

In the absence of retraction of the tubes, and with the tubes fully extended, the rigidizing apparatus indicated generally at 42 is in a position such that a plurality of pivotably mounted rigidizing struts as at 106 are in the dotted line position shown in FIG. 1, rather than the full line position. In this respect, a plurality of ears 102 are rigidly mounted to outside of the inner tube 72, or integral therewith, near gimbal 38, at circumferentially spaced positions, the rigidizing struts being either three or four as desired. The struts 106 which are elongated planar members are pivoted on pins 104 to ears 102 and springs 108 are wrapped about the pins 104 with ends bearing respectively on ears 102 and the upper edges of the rigidizing struts 106, thus tending to bias the rigidizing struts to generally right angle, radial positions as shown in dotted line, absent retraction action given to the inner tube 72 relative to outer tube 70 of boom 34. The rigidizing struts 106 are so configured that flat edges 106a tend to contact the outer periphery of the light weight drogue guide cone 17 during retraction action. In that respect, a cable 112 is provided for each rigidizing strut 106, each cable 112 being connected at one end as at 110 to the rigidizing strut 106 intermediate of its pivot axis defined by pin 104 and the contact point along edge 106a contacting the periphery of the drogue cone 17. The cables are led over pulleys 116 borne by the outer tube 72 by way of mount 114 within that tube and tenter the interior of the tube 72 via openings 115. They are connected jointly to a coupling 130 fixed to the end of a piston rod 122 forming components of the spring cartridge 44. The spring cartridge 44 is cylindrical including outer casing or cylinder 118. Casing 118 bears a piston 120 internally thereof and fixed to the end of the rod 122. An apertured cap 128 closes off the opposite end of casing 118, through which projects rod 122, and interposed between cap 128 and piston 120 is a coil spring 124 functioning as a shock absorber for the system. A pair of rings 126 fixedly mount cylinder 118 to the interior of the inner tube 72, intermediate of its ends.

Projecting from the end face of cylinder 118 to the opposite end of that cylinder from cap 128, is an ear 132, to which is coupled one end of retraction cable 134. Cable 134 feeds through opening 136 within tube end 72a, opening 138 within plate 74 and opening 140 within base plate 30 with the other end of the retraction cable 134 fixedly coupled to base plate 30, via bracket 150. The cable 134 contacts the periphery of a guide pulley 152 for alignment with hole or opening 140, and is leaved over pulley 154 forming a part of the cable tensioner mechanism 48. Additionally, the retraction cable 134 passes over pulley 148 mounted to the end of the jack screw 146, which jack screw 146 is caused to threadably project from and retract into an electrical retraction motor 142 forming a part of mechanism 46. The motor 142 is fixedly mounted to the base plate 30 by way of feet 144.

The cable tensioner mechanism 48 involves the utilization of a bracket 160 which fixedly mounts a pin 162, pin 162 projecting through a slot 164 within slide 158. The slide bears on one end, the cable tensioner pulley 154, while its opposite end is connected to a constant force spring 166 borne by drum 168, the drum 168 being mounted to the base plate 30 by way of bracket 170.

As may be appreciated, boom retraction and projection is controlled solely by rotation of jack screw 146 driven by motor 142 with the tension acting on the retraction cable 134 being maintained constant via the cable tensioner and particularly the constant force spring 166.

As an optional feature, the present invention may employ the azimuth drive mechanism 50 comprising a motorized jackscrew 172, having one end mounted to plate 54 via one spherical rod end 174 and bearing an extendable and retractable rod 176 terminating in another spherical rod end 178 fixed to the periphery of the hard stop disc 74 to permit orthogonal pivoting of boom 34. Further, the electromagnet core 95 may support a motor switch indicated schematically at 96 having a plunger 96a, FIG. 2A, projecting axially outwardly therefrom, which plunger 96a, upon depression by initial contact with the passive iron target 98 causing energization of the electrical retraction motor 142, via control panel 97. This causes retraction of the retraction cable 134 driving the inner tube 62 axially into outer tube 70, thus telescoping the assembly. The initial result of this action is to shift the rigidizing struts 42 from their dotted line position to their full line position, automatically aligning the captive vehicle 12 for pitch and yaw. This will be appreciated hereinafter by further reference to FIGS. 2A to 2E.

Upon accomplishing the orientation shown in FIG. 1 and automatic alignment for pitch and yaw, further means under operation of switch 96 and control panel 97 supplies current to the azimuth drive motorized jackscrew 172, to rotate the boom 34 about its axis along with cylindrical piston 56, within fixed cylinder 52, to correct for roll between the captive spacecraft 12 and the docking spacecraft 10. In the illustrated embodiment this causes axes 24 and 26 of space vehicles 10 and 12 to become aligned.

The present invention encompasses a satellite docking system which permits soft docking of one space vehicle to a second space vehicle such as an orbiting satellite and which is effected without damage to the attitude control system of the space vehicle being captured. Further, during the initial stage where the magnetic probe of the docking vehicle seeks the magnetic target of the captive or target vehicle, the magnetic probe through its boom is uncaged. Subsequent to capture the system achieves automatically, proper captive vehicle orientation in pitch and yaw by rigidizing of the probe, relative to the docking vehicle. Roll correction may be achieved by the utilization of the azimuth drive motor of the magnetic probe itself. Alternatively, by use of two such initially uncaged soft docking magnetic probes, via the probe rigidizing mechanism, there is not only achieved automatic alignment in pitch and yaw of the two space vehicles, but additionally automatic roll correction; thereby eliminating the need for the azimuth drive motor and its linkage.

Reference to FIGS. 2A and 2E inclusive shows the nature in which the magnetic type soft docking is achieved by the system of the invention in one form. There is a single magnetic probe 14 which acts in conjunction with a hard dock mechanism 18 to the opposite side of the docking vehicle 10 and which engages the captive or target vehicle 12 during operation of the retraction mechanism of the single magnetic probe 14 to rigidly, mechanically lock the vehicles together under proper alignment in pitch, yaw and roll.

The docking sequence is initiated, FIG. 2A, by moving the docking vehicle 10 into a position of near axial orientation such that the axis 24 of the docking vehicle 10 is generally aligned with the axis 26 of the captive vehicle 12. This is achieved conventionally by the utilization of thrusters as at 180. The thruster 180 on vehicle 10 to the upper right is shifted outward to avoid disturbing the satellite or captive vehicle 12 prior to capture. The boom 34 is in its fully extended position. The rigidizing struts 106 ar essentially radially deployed and in the dotted line position, FIG. 1. Probe 14 is thus in its extended and uncaged position. The electromagnet 40 may pivot relative to the axis of the boom 34 orthogonally, restrained only by the light compression coil spring 91, while similarly at the opposite end of the boom 34, the boom may pivot orthogonally relative to base 22, about mutual right angle axes defined by pins 68 and 80, again restrained only by the light bias of coil spring 76. As vehicle 10 moves closer to vehicle 12, the electromagnet 40 is mechanically deflected by contact with the light weight drogue cone 17. Cone 17 mechanically directs the electromagnet 40 towards the magnetic target 98, at the apex of cone 17. The electromagnet coil 94 which is energized causes electromagnet 40 to seek the iron target 98 and lock-on. The depression of plunger 96a, FIG. 1A of target 98, by plunger impact of microswitch 96, carried by the electromagnet core 95, functions to close the microswitch and energize the retraction motor 142, to initially partially retract the retraction cable 134. This causes the struts 106 to pivot from the dotted line position of FIG. 1 towards the full line position and against the bias of springs 108.

Further, the kinetic energy due to $V_X$ (vehicle 10 movement along the X axis, i.e. axis 24) is absorbed by the springs 108 biasing on the struts 106, coil spring 124 of the cartridge 44, coil spring 82 interposed between the end 72a of the inner tube 72 and plate 74, as well as coil spring 58. Spring 58 takes up for transverse thrust due to angulation of boom 34 (caused by misalignment of axes 24 and 26 of vehicles 10 and 12 during initial docking contact). This action is illustrated in FIG. 2C. Additionally, since the end 72a of the inner tube 72 functions as a piston within the outer tube 70 (which acts as a cylinder), there is some coulomb damping of impact shock. The retraction force exerted by motor 142, via the jack screw 146, automatically moves all of the struts 106 into identical angular positions such that their flat edges 106a contact the outer peripheral edge of the drogue cone 17, insuring at least that the axes 24 and 26 of the two vehicles 10 and 12 are parallel, if not aligned. The position of the vehicles are thus as shown in FIG. 2D under the rigidizing effect by way of the contact between struts 106 under tension by tensioning mechanism 48 and forcibly driven to the position shown by jack screw 146 and retraction drive motor 142. Inertia effects are overcome and shock taken up by the spring cartridge 44. Additionally, the coil springs 91 and 76 tend to force axial alignment of all components, i.e. cylinder assembly 32, boom 34, and electromagnet 40.

Assuming that a roll correction is required, that is, even though axes 24 and 26 are parallel, there is no coincidence, under a proper command from control panel 97, the motorized jackscrew 172 of the azimuth drive mechanism 50 is energized to the extend required and in the direction needed to forcibly drive the captive space vehicle or satellite 12 about the axis of the boom 34 to the point where axes 24 and 26 of space vehicles 10 and 12 are in alignment. The soft magnetic docking probe system is then capable of engaging the captive vehicle 12 by the docking vehicle 10 through the hard dock mechanism 18. In that respect, the base or support 182 bears rigid post 184. Post 184 has coupled thereto remote from base 182, a hard dock latch as at 186 which functions to mechanically grasp a projecting pin 188 which projects at right angles from the body 11 of the captive vehicle to the side opposite bracket 100 mounting the drogue 16. In a simple form, the latch 186 may comprise a U-shaped member which simply receives the projection or pin 188 to closely engage the same and to thereby effectively mechanically lock the vehicles together under proper pitch, yaw and roll alignment, maintained effectively in place by jack screw 146 during full retraction of boom 34, as evidenced in contrasting FIGS. 2D and 2E. Thus, from FIGS. 2D to 2E, a command from the control panel to the azimuth drive motor initially permits roll correction (if required) while a further command from the control panel to the retraction motor 142 causes the cable 134 to retract the smaller tube 72 within the larger tube 70 of the boom 34 against the bias of spring 82 to the extent where the hard dock latch or latches are engaged.

As may be appreciated, in the sequence of operations illustrated in FIGS. 2A–2E, the uncaged electromagnet 40, being attached to an orthogonally pivotable shock-absorbing boom functions to initially capture or "soft dock" the probe vehicle with an orbiting space vehicle such as a satellite. Upon capturing of the satellite, the boom is rigidized and the satellite is automatically aligned in a desired orientation in pitch and yaw. It is the retraction of the probe boom under energization of the electric motor and acting through a cable that results in rigidizing the probe and aligning of the satellite in pitch and yaw. Alternatively, a conventional azimuth drive mechanism may be used to orient the satellite in roll or by utilizing two magnetic probes such roll correction is achieved automatically. Further retraction of the probe or probes 14 causes the satellite to engage in a "hard dock" as required. Kinetic energy due to relative motion between the two bodies is absorbed by the probe springs and internal coulomb damping.

While the invention has been particularly shown and described with reference to a preferred embodiment thereof, it will be understood by those skilled in the art that various changes in form and details may be made therein without departing from the spirit and scope of the invention.

What is claimed is:

1. An improved magnetic soft docking probe for impact free docking of a docking space vehicle to a captive space vehicle, said captive space vehicle comprising:
   a magnetic target member fixedly carried by captive space vehicle,
   guide means surrounding said magnetic target member;
   said docking space vehicle comprising:
   a magnetic probe, said probe including;
   an electromagnet,
   an extendable and retractable boom, and
   spring biased gimbals carried at respective ends of said boom and connected to said electromagnet and said docking space vehicle, respectively,
   such that said spring biased gimbals function to uncage said probe yet act to guide the magnetic probe into contact with the magnetic target by magnetic attraction between said members, and to axially align said electromagnet, said boom and said docking space vehicle to provide proper pitch and yaw alignment between the docking space vehicle and the captive space vehicle, subsequent to said electromagnet contacting said magnetic target member.

2. The docking probe as claimed in claim 1, wherein said guide means comprises a light weight drogue cone and said magnetic target member is carried at the apex of said cone such that said electromagnet seeks the axis of said drogue cone, and wherein said docking space vehicle further comprises a plurality of rigidizing struts pivotably mounted at one end to the side of said boom for pivoting at circumferentially spaced positions thereabout between axially aligned and radial positions, means for spring biasing said struts to generally radial position, and wherein said struts are of a length such that edges thereof contact the circular edge of the light weight drogue cone and wherein said docking space vehicle includes drive means for at least causing said plurality of rigidizing struts to pivot uniformly angularly into contact with the circular edge of the light weight drogue cone against said bias to automatically align the boom in pitch and yaw.

3. The docking probe as claimed in claim 1, further comprising an azimuth drive motor carried by said docking space vehicle and operatively engaging said boom for rotating said boom about its axis and to thereby drive the captive space vehicle, by reaction, about the axis of said boom for roll control of the captive space vehicle relative to the docking space vehicle.

4. The docking probe as claimed in claim 2, further comprising an azimuth drive motor carried by said docking space vehicle and operatively engaging said boom for rotating said boom about its axis and to thereby drive the captive space vehicle, by reaction, about the axis of said boom for roll control of the captive space vehicle relative to the docking space vehicle.

5. The docking probe as claimed in claim 1, wherein said boom comprises telescoping tubes, and said probe further comprises a cylindrical piston assembly for mounting one end of said telescope tubes to said probe space vehicle via one of said spring biased gimbals including a base plate, said cylindrical piston assembly comprises a cylinder projecting outwardly of said base plate, a spring biased piston mounted within said cylinder for rotation about the axis of said cylinder and for axial movement with respect to said cylinder, stops carried by said cylinder and said cylindrical piston for limiting axial movement between said piston and said cylinder, and a compression coil spring interposed between said base plate and the end of said cylindrical piston to absorb impact lateral forces when said uncaged boom bearing said electromagnet, impacts against the magnetic target member carried by said captive space vehicle, and wherein said boom is permitted to rotate about its axis by rotation of said cylindrical piston relative to the cylinder fixed to said base plate.

6. The docking probe as claimed in claim 5, further comprising an azimuth drive motor coupled to said docking space vehicle and operatively engaging said telescoping tube assembly to thereby drive said telescoping tube assembly about its axis and said captive space vehicle, by reaction, about the axis of said telescoping tube assembly for roll control of the captive space vehicle relative to the docking space vehicle.

7. The docking probe as claimed in claim 2, wherein said drive means comprises a retraction cable operatively coupled at one end to said spring biased struts for pivoting said struts against said spring bias means, a retraction drive motor operatively coupled to said cable for initially causing said plurality of rigidizing struts to pivot uniformly angularly into contact with the circular edge of the light weight drogue cone and for subsequently retracting said extensible and retractable boom towards said docking space vehicle, and means for providing constant tension to said retraction cable to maintain automatic boom alignment in pitch and yaw and said captive space vehicle retracted to said docking space vehicle and spaced therebetween, determined by the extent of operation of said retraction drive motor.

8. The docking probe as claimed in claim 4, wherein said drive means comprises a retraction cable operatively coupled at one end to said spring biased struts for pivoting said struts against said spring bias means, a retraction drive motor operatively coupled to said cable for initially causing said plurality of rigidizing struts to pivot uniformly angularly into contact with the circular edge of the light weight drogue cone and for subsequently retracting said extensible and retractable boom towards said docking space vehicle, and means for providing constant tension to said retraction cable to maintain automatic boom alignment in pitch and yaw and said captive space vehicle retracted to said docking space vehicle and spaced therebetween, determined by the extent of operation of said retraction drive motor.

9. The docking probe as claimed in claim 6, wherein a drive means comprising a retraction cable is operatively coupled at one end to said spring biased struts for pivoting said struts against said spring bias means, a retraction drive motor is operatively coupled to said retraction cable for initially causing said plurality of rigidizing struts to pivot uniformly angularly into contact with the circular edge of the light weight drogue cone and for subsequently retracting said extensible and retractable boom towards said docking space vehicle, and said docking probe further comprises means for providing constant tension to said retraction cable to maintain automatic boom alignment in pitch and yaw and said captive space vehicle retracted to said docking space vehicle and spaced therebetween, determined by the extent of operation of said retraction drive motor.

10. The docking probe as claimed in claim 9, wherein one of said telescoping tubes is projectable outwardly from the other of said tubes, said projectable tube bearing said struts, and wherein said projectable tube bears internally and fixedly mounted thereto a spring cartridge, said spring cartridge comprising a cylindrical casing fixed to the interior of said projectable tube, a spring biased piston within said cylindrical casing, a plurality of cables operatively coupled at their one ends to respective, individual struts and at their opposite ends jointly to said piston and a coil spring interposed between said piston and said casing tending to bias said piston towards one end of said casing remote from the end of said casing proximate to said struts, and wherein said retraction cable is operatively coupled at one end to said casing such that initially operation of said retraction motor tends to force the edges of the struts into contact with the peripheral edge of the drogue cone and to thereby align said boom telescoping tubes in pitch and yaw with respect to said captive space vehicle, while subsequently continued retraction of said retraction cable causes said one telescoping tube to retract within the other and to shorten the distance between said space vehicles.

11. An improved magnetic soft docking system for impact free docking of a docking space vehicle to a captive space vehicle, said system comprising:
a magnetic target member fixedly carried by said captive space vehicle,
guide means surrounding said magnetic target member to guide a magnetic probe into contact with said magnetic target member by magnetic attraction between said members,
said docking space vehicle comprising a magnetic probe, said probe including an electromagnet, an extendable and retractable boom, and spring biased gimbals carried at respective ends of said boom and connected to said electromagnet and said docking space vehicle, respectively,
whereby said spring biased gimbals function to uncage said probe, yet act to guide said magnetic probe into contact with said magnetic target member by magnetic attraction between said members and to axially align said electromagnet, said boom and said docking space vehicle to provide proper pitch and yaw alignment between said docking space vehicle and said captive space vehicle, subsequent to said electromagnet contacting said magnetic target member.

12. The docking system as claimed in claim 11, wherein said guide means comprises a light weight drogue cone and said magnetic target member is carried at the apex of said cone such that electromagnet seeks the axis of said drogue cone, and wherein said docking space vehicle further comprises a plurality of rigidizing struts pivotably mounted at one end to the side of said boom for pivoting at circumferentially spaced positions thereabout between axially aligned and radial positions, means for spring biasing said strut to general radial position, and wherein said struts are of a length such that edges thereof contact the circular edge of the light weight drogue cone, and wherein said docking space vehicle includes drive means for at least initially causing said plurality of rigidizing struts to pivot uniformly angularly into contact with the circular edge of said light weight drogue cone against said bias to automatically align the boom in pitch and yaw.

13. The docking system as claimed in claim 12, further comprising an azimuth drive motor carried by said docking space vehicle operatively engaging said boom for rotating said boom about its axis and to thereby drive said captive space vehicle by reaction, about the axis of said boom for roll control of said captive space vehicle relative to said docking space vehicle.

* * * * *